(12) United States Patent
Lambert (10) Patent No.: US 7,354,228 B2
(45) Date of Patent: Apr. 8, 2008

(54) DRILLING TOOL FOR INSERTION OF CABLING

(75) Inventor: Kurt D. Lambert, Madison, ME (US)

(73) Assignee: Richard T. Johnson, Skowhegan, ME (US)

( * ) Notice: Subject to any disclaimer, the term of this patent is extended or adjusted under 35 U.S.C. 154(b) by 216 days.

(21) Appl. No.: 11/361,549

(22) Filed: Feb. 24, 2006

(65) Prior Publication Data

US 2007/0201963 A1 Aug. 30, 2007

(51) Int. Cl.
*B23B 51/08* (2006.01)
(52) U.S. Cl. .......................... 408/226; 408/83
(58) Field of Classification Search ............. 408/72 B, 408/72 R, 79, 80, 81, 83, 226
See application file for complete search history.

(56) References Cited

U.S. PATENT DOCUMENTS

| | | | |
|---|---|---|---|
| 2,812,791 A * | 11/1957 | Mackey | 408/212 |
| 3,865,502 A * | 2/1975 | Hamann | 408/226 |
| 4,076,444 A * | 2/1978 | Siebrecht | 408/226 |
| 4,230,305 A | 10/1980 | Comroe | |
| 4,329,540 A | 5/1982 | Howarth | |
| 4,474,513 A * | 10/1984 | Salyers | 408/110 |
| 5,184,793 A | 2/1993 | Heidt | |
| 5,395,188 A * | 3/1995 | Bailey et al. | 408/127 |
| D387,254 S | 12/1997 | Klamm | |
| D403,932 S | 1/1999 | Klamm | |
| 5,888,035 A * | 3/1999 | Cutler | 408/225 |
| 6,171,033 B1 * | 1/2001 | Wrobel | 408/239 R |
| 6,840,483 B1 | 1/2005 | Dickens | |
| 2004/0013483 A1* | 1/2004 | Thomsen | 408/226 |

* cited by examiner

*Primary Examiner*—Monica Carter
*Assistant Examiner*—Eric A. Gates
(74) *Attorney, Agent, or Firm*—Anthony D. Pellegrini (57) ABSTRACT

An improved drilling tool for drilling into and through walls for the purpose of inserting cabling within same, comprising a drill bit and an elongated primary shaft suitably adapted to create a chaseway within a wall during the drilling process. The elongated primary shaft may itself be the chaseway, in which case it is hollow, or it may carry a chaseway in the form of a conduit placed over a solid primary shaft. The cabling is then placed into the wall by use of the chaseway or by use of a separate conduit inserted into the wall through the chaseway.

23 Claims, 7 Drawing Sheets

DRILLING TOOL FOR INSERTION OF CABLING

BACKGROUND OF THE INVENTION

1. Technical Field

The invention relates generally to the field of hand tools useful in the construction industry. More specifically, the invention is directed to an improved drilling tool useful for inserting cabling into and through walls during renovation of existing structures.

2. Description of Prior Art

Modern buildings often contain a variety of cables and wires, such as electrical wires, telephone wires, cable TV wiring, Ethernet cables, and the like, within and between their walls. Placing the cabling is a relatively simple task with new construction, since the walls are not yet finished. However, with renovations to existing structures, it is often quite difficult to run cables though existing walls, because of the outer finish of the walls and also due to materials already present within the walls, such as insulation, pipes, existing wiring, and the like. Access to the interior of existing walls is ordinarily performed by drilling into them, using a power drill with an elongated drill bit. However, the resulting holes made by such tools are frequently obstructed by the various materials present within the walls, making it difficult if not impossible to run new cabling therein.

One potential solution to this problem involves the use of a wire snake, a rigid or semi-rigid device that is inserted into a preexisting hole through a wall. The wire or cabling is attached to the trailing end of the snake, and once the leading end of the snake is passed through the exit hole on the opposite side of the wall the snake is drawn through, with the wire following. Examples of wire snake devices are found in Klamm, U.S. Pat. No. D387,254 (Dec. 9, 1997), "Wire Snake" and Klamm, U.S. Pat. No. D403,932 (Jan. 12, 1999), "Combined Wire Snake with Locking Clip". These patents disclose devices for snaking wiring or cabling through a wall. These snakes have an engagement portion to which the wiring or cabling is attached, after a length of the device has been inserted into and through the wall. Once the wiring or cabling is attached, the device is withdrawn, drawing the wiring or cabling behind it. There is no indication of how the hole is initially prepared, nor how the snake devices may be easily threaded through that hole. Also, Comroe, U.S. Pat. No. 4,230,305 (Oct. 28, 1980), "Fish Grabber for Use in Electrical Wire Installation", discloses a special purpose snake device intended to attach to a hooked end of a lead. The wire is attached to the lead and partially inserted into a wall from one side of the wall, then the snake device is inserted into the wall from the other side of the wall and positioned until it attaches the lead. The snake device is then withdrawn, drawing the lead and attached wire along with it. The use of these and other snake devices is problematic for numerous reasons. First, the creating of the hole through the wall and the insertion of the snake through that hole is indeterminate. Using a drill to make the hole does not account for the potential for obstructions within the wall to shift across the newly created hole once the drill is removed. Second, the wire must be attached to the device, which involved a degree of effort and time. As the wire is being drawn through the wall, the attachment of the wire to the snake may break, resulting in failure. Even if the wire doesn't break, it may be stretched or otherwise damaged while being pulled through whatever materials occupy the interior of the wall.

Another potential solution to this problem involves the use of a rigid or semi-rigid conduit through which to run the cabling. The conduit is inserted into the wall after the hole is drilled and the drilling tool is removed. Dickens, U.S. Pat. No. 6,840,483 (Jan. 11, 2005), "Cable Feed Bushing and Method of Installing a Cable through a Wall or Other Structure", discloses a type of conduit, whereby the conduit itself (the "bushing") is conical and has external threads and may be drilled into a wall by use of an auxiliary hand tool. This conduit is available only for walls having very little thickness, and does not work where obstructions exist within the wall itself. Howarth, U.S. Pat. No. 4,329,540 (May 11, 1982), "Blocking Feed-Through for Coaxial Cable", is another example of the use of a conduit. It discloses a cylindrical conduit that is permanently fixed within a wall to receive a coaxial cable. It also discloses end caps for the conduit. However, there is no description of how the conduit is placed within the wall, nor for that matter how the hole in the wall is initially created in order to receive the conduit. The end caps are not intended to hold the conduit in place but rather to seal the ends of the conduit, along with a curable adhesive placed within the conduit and surrounding the coaxial cable. With any conduit device inserting the conduit into the walls is often just as difficult as inserting the cabling directly. This may be due to elements within the walls shifting upon withdrawal of the drill bit used to make the hole, so that even a fairly rigid conduit will strike obstructions and be prevented from penetrating in the desired manner. Even without the movement of obstructions within walls and a relatively free passage, simply aligning a conduit through the entrance hole, through the wall, and out the exit hole is a difficult task, in no small part because of the need to create entrance and exit holes as small as possible for aesthetic purposes. As such, sight lines are generally non-existent and any attempts to run a conduit are exercises in trial and error.

The prior art does not disclose a satisfactory solution to the above-described problem, yet there remains a need in the construction industry for a tool to simply and efficiently allow the running of cabling within existing walls. The present invention is a solution to this problem.

The present invention seeks to alleviate the aforesaid problems by providing a tool which creates a hole for the cabling and a protected chaseway at the same time. This protected chaseway permits either the direct insertion of cabling or the insertion of a conduit, easily and quickly.

It is therefore an objective of the present invention to provide a useful, improved drilling tool that can be used to create a hole through existing walls and simultaneously a protected chaseway through which cabling may be inserted.

It is a further objective of the present invention to provide a useful, improved drilling tool that can be adapted to different structural conditions, including extra thick walls.

It is a further objective of the present invention to provide a useful, improved drilling tool that accommodates various types of cabling of various thicknesses.

It is a further objective of the present invention to provide a useful, improved drilling tool that is simple to use.

It is a further objective of the present invention to provide a useful, improved drilling tool that is cost efficient to manufacture.

Other objectives of the present invention will be readily apparent from the description that follows.

SUMMARY OF THE INVENTION

The present invention is an improved drilling tool which solves the problem of running cabling within walls of existing construction. This novel and useful tool is comprised of an elongated hollow primary shaft attached to a drill bit, said tool to be used with a standard power drill, with the end of the primary shaft opposite the drilling bit placed in connection with the power drill. The primary shaft is of a length sufficient to allow the tool to penetrate a wall from entrance hole to exit hole. Because the primary shaft is attached to the drill bit, it passes through any obstruction within the wall as the hole is being created. Once the hole is complete, the tool is left in place and the power drill is detached from the primary shaft. The hollow primary shaft of the tool now comprises a chaseway within the wall, through which cabling may be inserted. With the cable fully inserted into the hollow primary shaft (the far end of the primary shaft is blocked by the drill bit), the tool is withdrawn from the opposite side of the wall, leaving the cable in place within the wall.

In an alternative embodiment, rather than inserting cabling into the hollow primary shaft, a conduit is inserted into the primary shaft. The tool is then removed as before, leaving the conduit in place within the wall. This allows cabling to be inserted into and through the conduit from either side of the wall, and also permits the conduit to remain permanently within the wall, if desired, to further protect the cabling. Because the conduit is inserted within the hollow primary shaft, there is no possibility of it becoming obstructed as it passes through the wall. This also permits a construction worker to drill holes at a convenient time, placing conduits to preserve the chaseways, then letting the cable be run at a later time.

In another embodiment, the tool comprises a hollow extension shaft which is has an outside diameter and an inside diameter substantially identical to those of the primary shaft. The extension shaft is attached to the primary shaft at the end of the primary shaft opposite the drill bit, and the other end of the extension shaft is in connection with the power drill.

In yet another embodiment, the tool comprises a solid primary shaft, rather than a hollow primary shaft. However, the diameter of the solid primary shaft is substantially smaller than the diameter of the drill bit. The conduit is sized to be placed over the solid primary shaft, and has a diameter just slightly smaller than the diameter of the drill bit. Thus, during creation of the hole, the conduit follows the drill bit through the wall, bypassing obstructions. Upon completion of the hole the tool is removed from the drill and withdrawn from the opposite side of the wall, leaving the conduit in place within the wall. This configuration is useful where larger diameter cabling is needed. By moving the conduit to the outside of the primary shaft, the conduit may be significantly larger to accommodate thicker cabling. In this embodiment an extension shaft may also be used to increase the reach of the tool.

In other embodiments the drill bit may be removable from the primary shaft, so that cabling may be inserted into the hollow primary shaft from the opposite side of the wall as the power drill. This may be useful where, for example, a large spool of cabling is located outside a structure, yet the location of the hole is most easily ascertained from inside the structure. In such case, once the hole is drilled from the inside and the power drill is removed, the opening to the hollow primary shaft is in the interior of the structure. By removing the drill bit from the hollow primary shaft, cabling can be inserted from the exterior to the interior.

Other features and advantages of the invention are described below.

DETAILED DESCRIPTION OF THE INVENTION

The drilling tool 1 of the present invention comprises a primary shaft 100, a drill bit 200, and a connection mechanism 300. See FIG. 1. In one embodiment, the primary shaft 100 is substantially cylindrical, hollow, and elongate. The outside diameter 120 of the primary shaft 100 is substantially uniform along its length, and the inside diameter 130 of the primary shaft 100 is substantially uniform along its length. The primary shaft 100 has a length sufficient to extend through the thickness of most walls. One end of the primary shaft 100 is designated the proximate end 140, and the opposite end of the primary shaft 100 is designated the distal end 150. The primary shaft 100 may be made of any suitable material having strength and rigidity. The preferred material is steel. Other metals and metal alloys are also contemplated within the scope of the claims.

Figure 1:
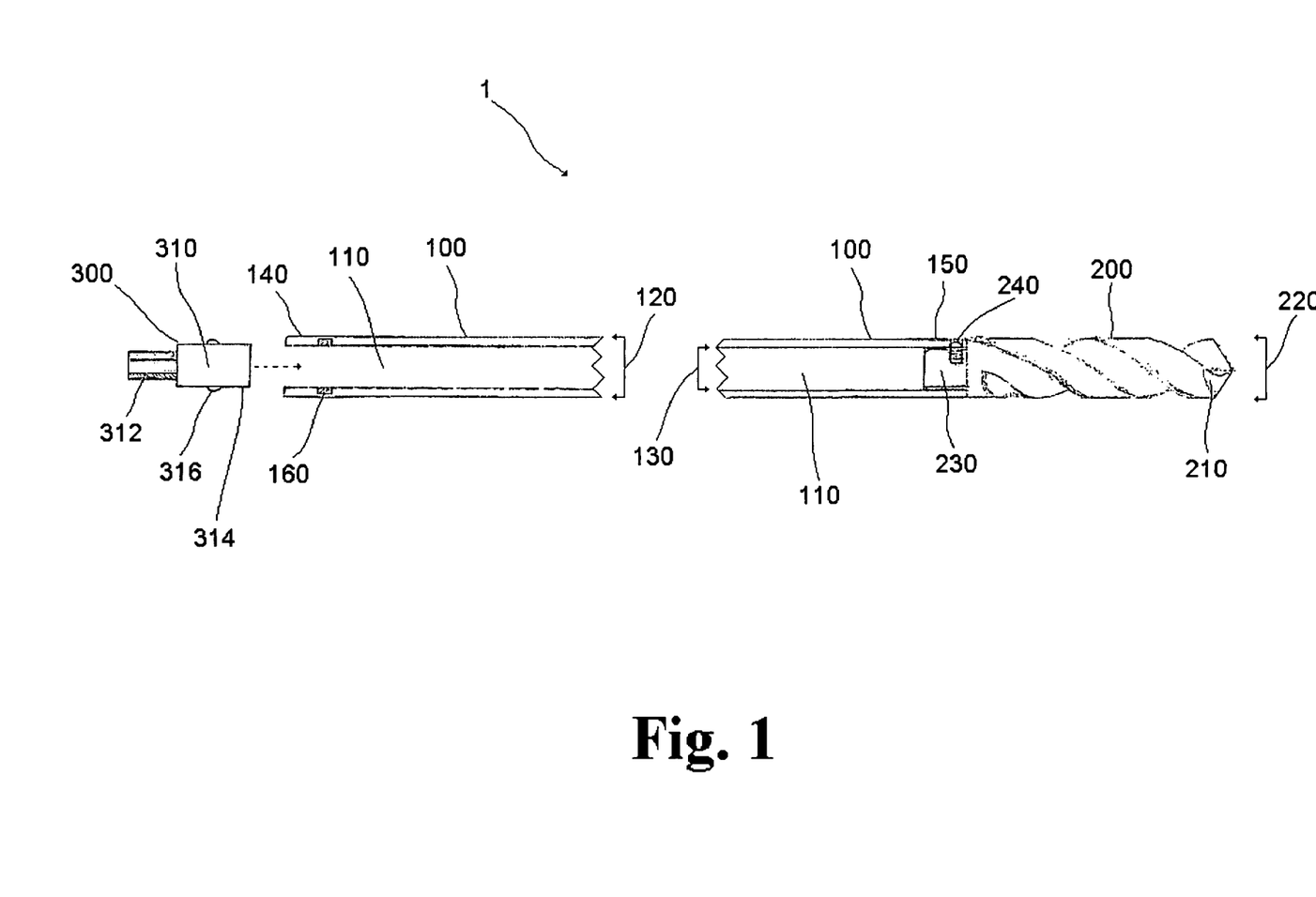
FIG. 1 is a side view of the drilling tool. The mid-section of the primary shaft is cut away in the drawing.

The drill bit 200 has a cutting end 210 and an attachment end 220 located opposite the cutting end 210. The cutting end 210 is suitably adapted to drill through materials, and may be of any type known in the art, including wood bits and masonry bits, and may be of any practical size. The diameter 230 of the drill bit 200, however, must be just slightly larger than the outside diameter 120 of the primary shaft 100, such that the hole created by the drill bit 200 is large enough to accommodate the primary shaft 100. The drill bit 200 is secured to the primary shaft 100 at its attachment end 220, which is secured to the distal end 150 of the primary shaft 100.

In one embodiment, the attachment end 220 of the drill bit 200 is welded to the distal end 150 of the primary shaft 100. In the preferred embodiment, the attachment end 220 of the drill bit 200 has a threaded aperture formed into it, aligned substantially perpendicular to the longitudinal axis of the drill bit 200. The distal end 150 of the primary shaft 100 also has a threaded aperture, aligned substantially perpendicular to the longitudinal axis of the primary shaft 100 and passing completely through the primary shaft 100. The attachment end 220 of the drill bit 200 is inserted into the interior 110 of the primary shaft 100 at the distal end 150 of the primary shaft 100 and the threaded apertures of both the attachment end 220 of the drill bit 200 and the distal end 150 of the primary shaft 100 are aligned. A set screw 240 is then used to secure the attachment end 220 of the drill bit 200 to the distal end 150 of the primary shaft 100. This configuration allows the drill bit 200 to be removed, for example for replacement purposes, simply by first removing the set screw 240.

In yet another embodiment, the attachment end 220 of the drill bit 200 is threaded and the distal end 150 of the primary shaft 100 is also threaded. These are reverse, or left-handed, threads. The drill bit 200 is then secured to the primary shaft 100 by threading the attachment end 220 of the drill bit 200 into the distal end 150 of the primary shaft 100. This configuration allows the drill bit 200 to be easily removed from the primary shaft 100. When so removed, and after the primary shaft 100 is released from the power drill, the primary shaft 100 becomes open at both ends 140,150, allowing cabling 50 to be inserted from either side.

The connection mechanism 300 of the drilling tool 1 is suitably adapted to secure the proximate end 140 of the primary shaft 100 to a power drill. The connection mechanism 300 may be integrated with the primary shaft 100 itself, whereby sides of the proximate end 140 of the primary shaft 100 are flattened so the proximate end 140 of the primary shaft 100 may be inserted directly into a power drill. In the preferred embodiment, the connection mechanism 300 comprises a separate adapter 310. The adapter 310 has a first end 312 and a second end 314, with the first end 312 of the adapter 310 being suitably adapted to be secured to the power drill and the second end 314 of the adapter 310 being suitably adapted to be secured to the proximate end 140 of the primary shaft 100. The second end 314 of the adapter 310 may have a hexagonal cross-section, to better be accommodated by standard power drills. The first end 312 of the adapter 310 may be threaded, and the proximate end 140 of the primary shaft 100 may be threaded, both being reverse threads. The adapter 310 is then secured to the primary shaft 100 by threading the second end 314 of the adapter 310 into the proximate end 140 of the primary shaft 100.

In the preferred embodiment, the adapter 310 further comprises a spring-ball-detent mechanism 316 at its second end 314. The primary shaft 100 further comprises one or more indentations 160 in its interior 1O at its proximate end 140. The indentations 160 are suitably adapted to accommodate the spring-ball-detent mechanism 316 of the adapter 310. The adapter 310 is then secured to the primary shaft 100 simply by inserting its second end 314 into the proximate end 140 of the primary shaft 100 such that the spring-ball-detent mechanism 316 engages with the indentations 160. This configuration is well-known in the art as a "quick release" coupling.

Figure 3:
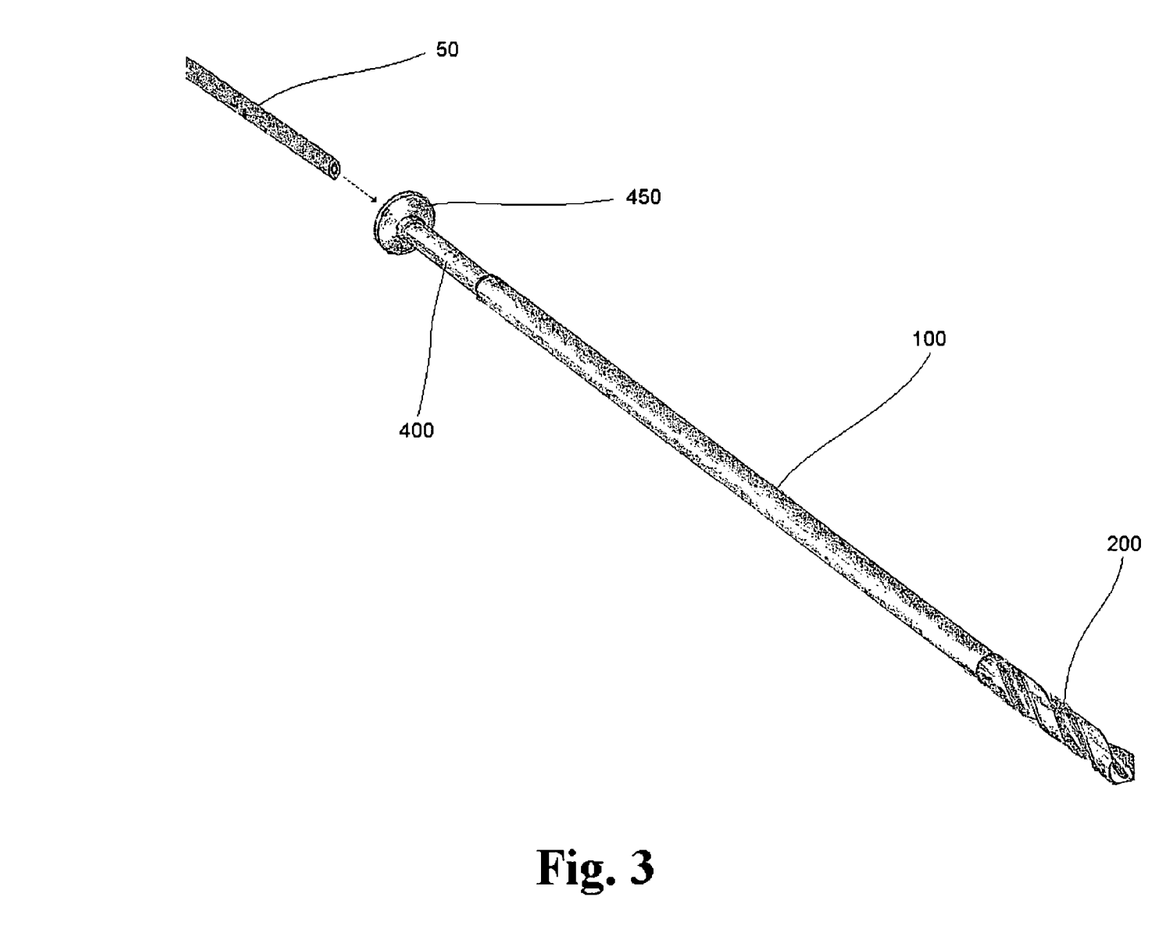
FIG. 3 is a perspective view of the drilling tool with a conduit partially inserted into the primary shaft, showing how cabling is inserted into the conduit.

The drilling tool 1 of the present invention is used by first securing the tool to a power drill by the connection mechanism 300, then using the power drill to rotate the tool to drill into and through a wall. Both the drill bit 200 and primary shaft 100 rotate together, and as the drill bit 200 is forced through a wall, drilling a hole, the primary shaft 100 follows along the newly created hole, preventing any materials within the wall from obstructing the hole. When the drilling operation is completed, the tool is left in place within the wall. The tool is detached from the power drill. If an adapter 310 was used, the adapter 310 is removed from the primary shaft 100. This results in the primary shaft 100 creating an open ended chaseway through the wall. Cabling 50 may now be inserted into the open proximate end 140 of the primary shaft 100 and fed all the way to the blocked distal end 150 of the primary shaft 100. See FIG. 3. In the embodiment of the tool with a removable drill bit 200, the drill bit 200 may then be removed from the distal end 150, allowing the end of the cable 50 to pass through the opposite side of the primary shaft 100. In either case, once the cable 50 has been completely inserted, the primary shaft 100 is withdrawn from the hole, leaving the cable 50 in place.

In one embodiment of the present invention, the drilling tool 1 further comprises a conduit 400. See FIG. 2A. The conduit 400 is substantially hollow and substantially cylindrical, and has a first end 430 and a second end 440. The interior 410 of the conduit 400 is sufficiently large to allow a cable 50 to pass into and through the conduit 400, while the outside diameter 420 of the conduit 400 is smaller than the inside diameter 130 of the primary shaft 100, thereby allowing the conduit 400 to be completely inserted into the interior 110 of the primary shaft 100. Once a hole has been drilled in a wall and the power drill removed from the primary shaft 100, as described above, the conduit 400 may be inserted into the interior 110 of the primary shaft 100. The primary shaft 100 is then withdrawn from the wall, as described above, leaving the conduit 400 in place within the wall. The cabling 50 may then be inserted into the wall through the conduit 400. The conduit 400 may be made of any suitable material, and having the property of rigidity or semi-rigidity. The preferred material is a semi-rigid plastic. Constructed of such material, the conduit 400 will resemble an extra long drinking straw. Other materials are also contemplated within the scope of the claims.

In the preferred embodiment, the drilling tool 1 further comprises at least one retaining cap 450. See FIGS. 2A and 2B. The retaining cap 450 is suitably adapted to be placed over and secured to the first end 430 of the conduit 400, thereby preventing that end 430 of the conduit 400 from passing into the interior of the wall. The retaining cap 450 may be of any shape, though a circular shape is preferred. It has an aperture in its center 458 suitably adapted to accommodate the outside diameter 420 of the conduit 400, to permit the retaining cap 450 to be frictionally secured to the conduit 400. Once attached, the retaining cap 450 is oriented substantially perpendicular to the longitudinal axis of the conduit 400. The retaining cap 450 has a surface area 452 larger than the diameter 230 of the drill bit 200, so that it cannot fit through the hole in the wall made by the drill bit 200. The retaining cap 450 is placed over the first end 430 of the conduit 400 prior to the insertion of the conduit 400 into the wall. When the primary shaft 100 is withdrawn the retaining cap 450 prevents the conduit 400 from following the primary shaft 100, retaining it in place. A second retaining cap 460 may then be placed over the second end 440 of the conduit 400, on the other side of the wall, retaining the conduit 400 in place while the cabling 50 is inserted. The second retaining cap 460 also has a surface area 462 larger than the diameter 230 of the drill bit 200. The second retaining cap 460 is also useful if the cabling 50 is to be inserted at a later time, to ensure the conduit 400 remains in place in the interim. The retaining caps 450, 460 may be made of any suitable material, though the preferred material is a rigid plastic. Other materials are also contemplated within the scope of the claims.

Figure 2A:
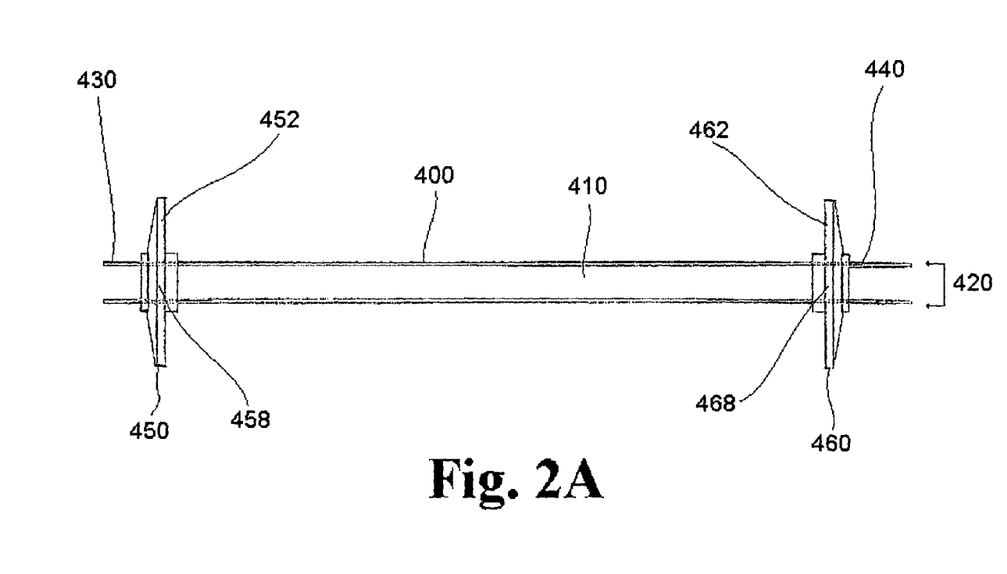
FIG. 2A is a side view of the conduit, with retaining caps.
Figure 2B:
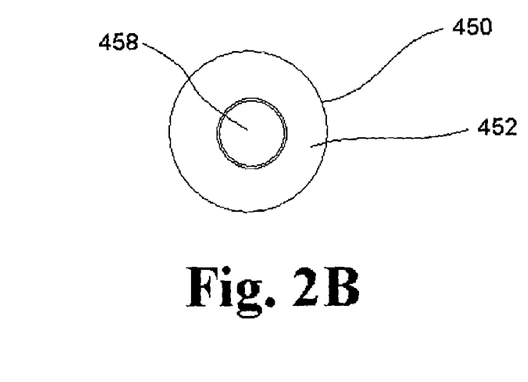
FIG. 2B is a plan view of the first retaining cap.

The retaining caps 450, 460 may be frictionally secured to the conduit 400 in any manner known in the art, including by having barbs along their central apertures 458, 468, or simply by having a tight tolerance with the conduit 400. In one embodiment the conduit 400 is constructed of a semi-flexible material, such as a plastic material, and the central apertures 458, 468 of the retaining caps 450, 460 have a diameter just slightly smaller than the outside diameter 420 of the conduit 400. In this configuration the conduit 400 is deformed slightly to allow the retaining caps 450, 460 to fit over the ends 430, 440 of the conduit 400, thus being frictionally secured thereto.

The connection mechanism 300 of the drilling tool 1 may also include an extension shaft 500. See FIG. 4. The extension shaft 500 is intended to increase the overall length of the tool to permit the tool to be used with thicker walls. The extension shaft 500 is substantially cylindrical, hollow, and elongate, with the outside diameter of the extension shaft 500 substantially uniform along its length and the inside diameter of the extension shaft 500 substantially uniform along its length. The outside diameter of the extension shaft 500 is substantially the same as the outside diameter 120 of the primary shaft 100, and the inside diameter of the extension shaft 500 is substantially the same as the inside diameter 130 of the primary shaft 100. In the preferred embodiment the extension shaft 500 is longer than the primary shaft 100. One end of the extension shaft 500 is designated the proximate end 540, and the opposite end of the extension shaft 500 is designated the distal end 550. The distal end 550 of the extension shaft 500 is suitably adapted to be secured to the proximate end 140 of the primary shaft 100, and the proximate end 540 of the extension shaft 500 is suitably adapted to be secured to the power drill. The extension shaft 500 is contemplated to be constructed out of the same types of materials as the primary shaft 100.

Figure 4:
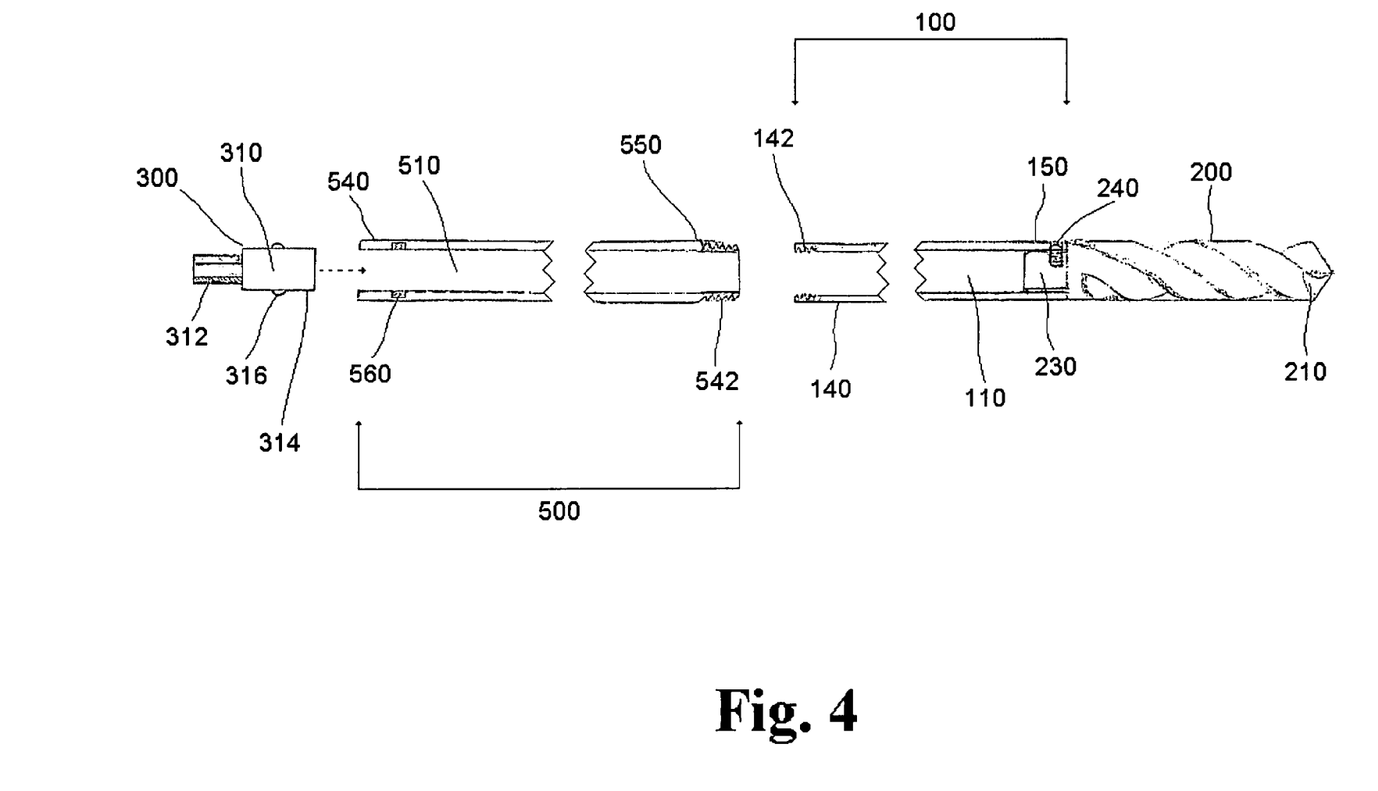
FIG. 4 is a side view of the drilling tool employing an extension shaft. The mid-section of the primary shaft is cut away; the mid-section of the extension shaft is cut away.

In one embodiment the distal end 550 of the extension shaft 500 is threaded 542 and the proximate end 140 of the primary shaft 100 is also threaded 142. These are reverse threads 142,542. The extension shaft 500 is then secured to the primary shaft 100 by threading the distal end 550 of the extension shaft 500 into the proximate end 140 of the primary shaft 100. Other means for attaching the extension shaft 500 to the primary shaft 100 are also contemplated within the scope of the claims.

In the preferred embodiment the connection mechanism 300 also comprises an adapter 310, configured as described above, used to secure the proximate end 540 of the extension shaft 500 to the power drill. In the most preferred embodiment the adapter 310 comprises a spring-ball-detent mechanism 316 and the extension shaft 500 comprises indentations 560 in its interior 510 at its proximate end 540, and the adapter 310 is used with the extension shaft 500 in the same manner as it is used with the primary shaft 100, as described above.

Figure 5:
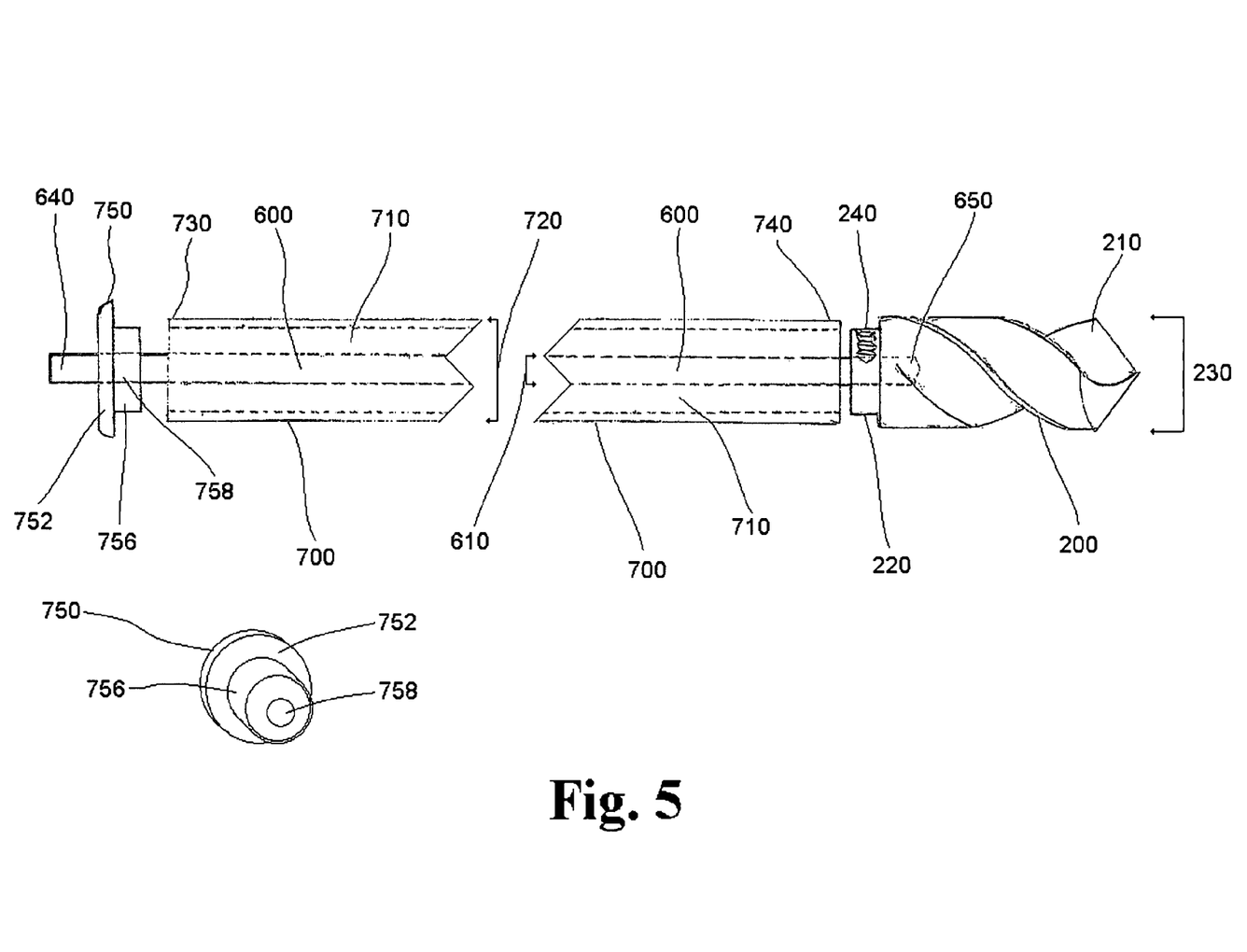
FIG. 5 is a side view of the drilling tool comprising the external conduit. The mid-section of the primary shaft is cut away; the mid-section of the conduit is cut away. A perspective view of the first retaining cap separate from the conduit is included.
Figure 6:
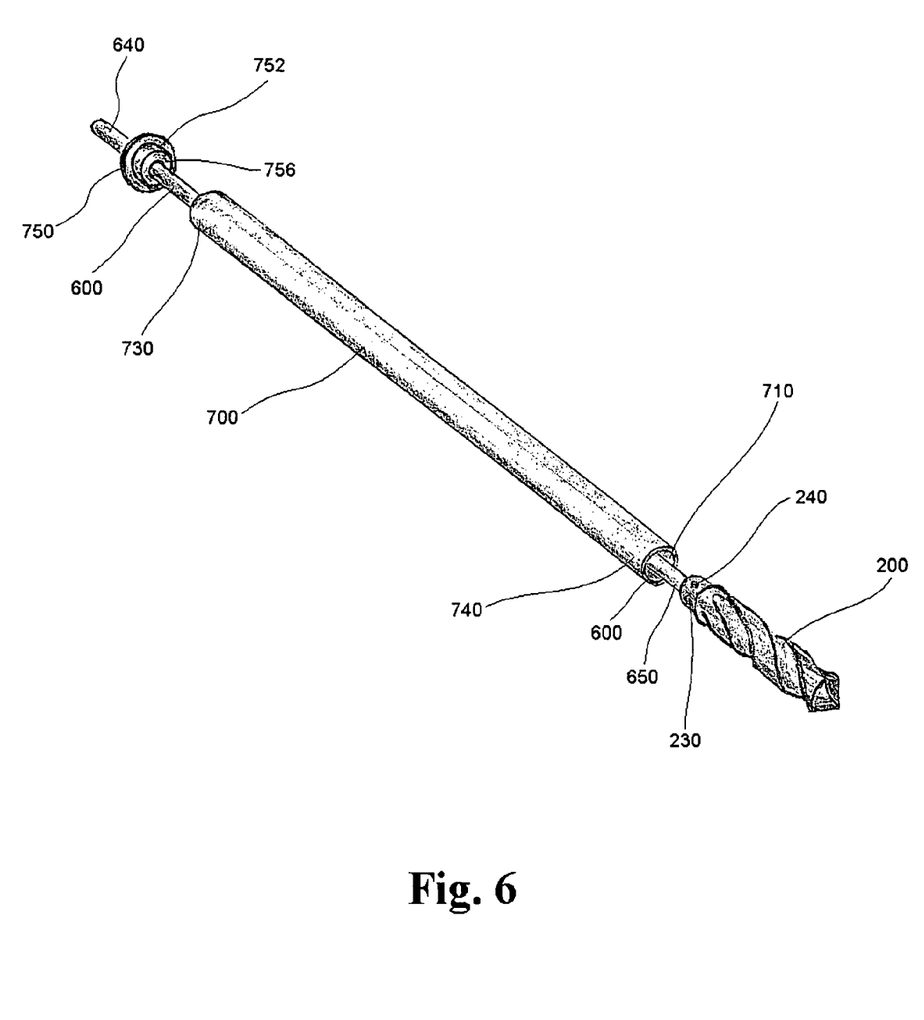
FIG. 6 is a perspective view of the drilling tool comprising the external conduit, with the conduit partially inserted over the primary shaft and with a retaining cap partially inserted over the primary shaft.

FIGS. 5 and 6 depict an alternative embodiment of the present invention, whereby the primary shaft 600 is solid and has an outside diameter 620 smaller than the diameter 230 of the drill bit 200. It has a proximate end 640 and a distal end 650. In this embodiment use of a conduit 700 is required. The conduit 700 is sized to fit over the solid primary shaft 600, having an inside diameter larger than the outside diameter 620 of the solid primary shaft 600. The outside diameter 720 of the conduit 700 must be slightly smaller than the diameter 230 of the drill bit 200. The conduit 700 is shorter than the solid primary shaft 600, and has a first end 730 and a second end 740. The conduit 700 is placed over the solid primary shaft 600 prior to drilling; during the drilling operation, the conduit 700 follows behind the drill bit 200 as the hole is drilled, creating a chaseway simultaneously with the creation of the hole. When the drilling is completed the solid primary shaft 600 is withdrawn from the conduit 700, leaving the conduit 700 in place in the wall. The conduit 700 in this embodiment is contemplated to be constructed of a rigid material. It is further contemplated to be of higher strength than the internal conduit 400 described above. The preferred material for this conduit 700 is a rigid plastic. Other materials are also contemplated within the scope of the claims.

In this embodiment, the conduit 700 must use a first retaining cap 750. See FIG. 5. The first retaining cap 750 serves the same function as the retaining caps 450, 460 used with the internal conduit 400, having the same elements, but it also serves an additional function. While the first retaining cap 750 of this embodiment also has a surface area 752 larger than the diameter 230 of the drill bit 200, it must also have a centering spindle 756 located at its center. The centering spindle 756 is substantially cylindrical and has a central aperture 758, located co-extensive with the central aperture of the first retaining cap 750. The longitudinal axis of the centering spindle 756 of the first retaining cap 750 is substantially perpendicular to the surface of the first retaining cap 750. The outer diameter of the centering spindle 756 is substantially the same, or just slightly smaller than, the inside diameter of the conduit 700. As such, the centering spindle 756 of the first retaining cap 750 may be inserted into the interior 710 of the first end 730 of the conduit 700, upon which the centering spindle 756 causes the first retaining cap 750 to be frictionally secured to the conduit 700. The interior diameter of the central aperture 758 of the first retaining cap 750 is suitably dimensioned such that the solid primary shaft 600 may be placed through the central aperture 758 of the first retaining cap 750. When the solid primary shaft 600 is placed through the central aperture 758 of the first retaining cap 750 the first retaining cap 750 is frictionally secured to the solid primary shaft 600. The result is that the first retaining cap 750 acts as a collar between the conduit 700 and the solid primary shaft 600, allowing the conduit 700 to rotate contemporaneously with the solid primary shaft 600 without undue lateral movements. A second retaining cap may also be used, having the same configuration as the first retaining cap 750. The second retaining cap is placed into the second end 740 of the conduit 700 after the hole is created in the wall and the solid primary shaft 600 is removed from the conduit 700, and serves to retain the conduit 700 within the wall.

In this embodiment, the drilling bit may be attached to the distal end 650 of the primary shaft 600 using the same reverse threading configuration as described above. It may also be welded to the distal end 650 of the solid primary shaft 600. In the preferred embodiment, the attachment end 220 of the drill bit 200 is hollow and the distal end 650 of the solid primary shaft 600 is suitably adapted to be inserted into the hollow attachment end 220 of the drill bit 200. Thereupon the drill bit 200 is secured to the solid primary shaft 600 using the same set screw 240 and threaded aperture configuration as described above. See FIG. 6.

Figure 7:
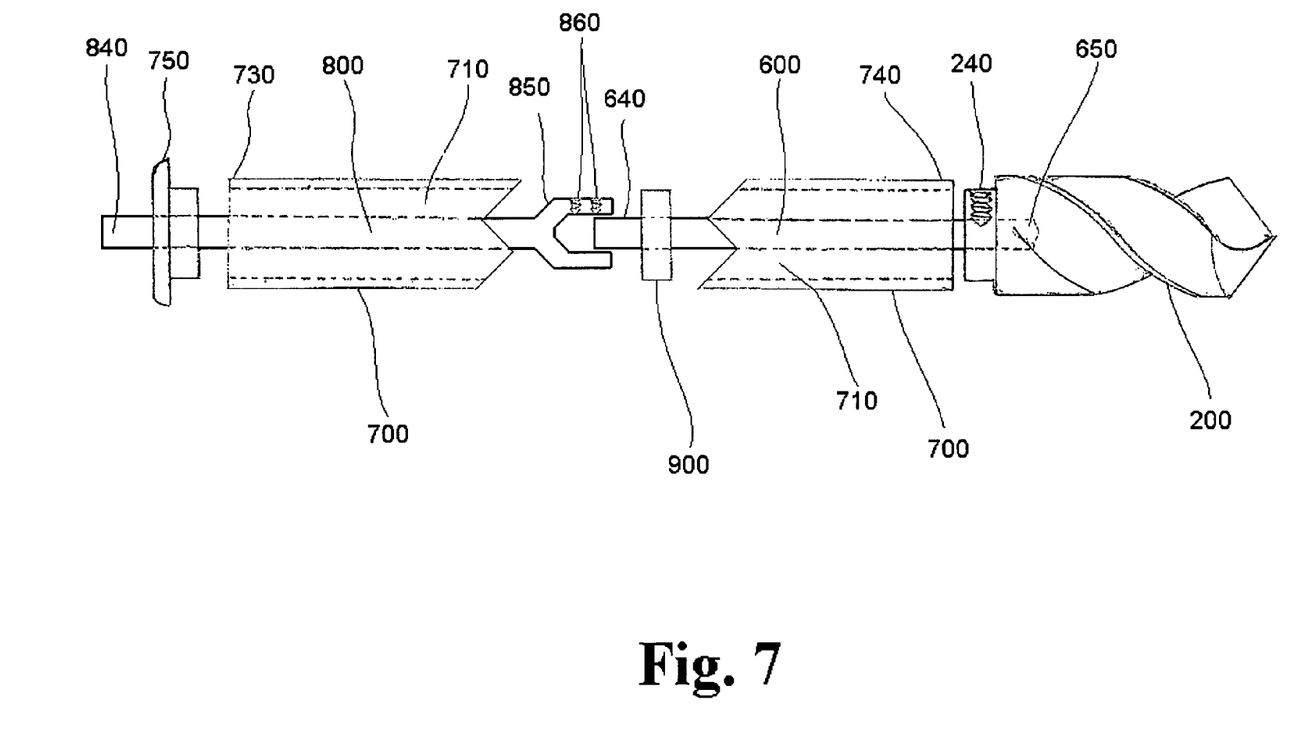
FIG. 7 is a side view of the drilling tool comprising the external conduit and employing an extension shaft. The mid-section of the external conduit is cut away.

In this embodiment, the connection mechanism 300 of the drilling tool 1 may also include an extension shaft 800. See FIG. 7. The extension shaft 800 is intended to be used in the same manner as described above. The extension shaft 800 is substantially cylindrical and elongate, with the outside diameter substantially uniform along its length and substantially the same as the outside diameter 620 of the primary shaft 600. In the preferred embodiment the extension shaft 800 is longer than the primary shaft 600. One end of the extension shaft 800 is designated the proximate end 840, and the opposite end of the extension shaft 800 is designated the distal end 850. The distal end 850 of the extension shaft 800 is suitably adapted to be secured to the proximate end 640 of the primary shaft 600, and the proximate end 840 of the extension shaft 800 is suitably adapted to be secured to the power drill. In one embodiment the distal end 850 of the extension shaft 800 is cylindrical and open ended, having an inside diameter substantially the same as the outside diameter 620 of the primary shaft 600, such that the proximate end 640 of the primary shaft 600 may be inserted into the distal end 850 of the extension shaft 800. The proximate end 640 of the primary shaft 600 is secured in place within the distal end 850 of the extension shaft 800 by one or more set screws 860. The set screws 860 may be removed to allow the primary shaft 600 to be detached from the extension shaft 800. An optional bushing 900 may be placed over the primary shaft 600 near its proximate end 640, the outside diameter of the bushing 900 being substantially the same as the inside diameter of the conduit 700, such that the bushing 900 centers the primary shaft 600 within the conduit 700. The extension shaft 800 is contemplated to be constructed out of the same types of materials as the primary shaft 600.

Modifications and variations can be made to the disclosed embodiments of the present invention without departing from the subject or spirit of the invention or methods.

I claim:

1. A drilling tool comprising a primary shaft, said primary shaft being hollow and substantially cylindrical, and having a length, an interior, an inside diameter, an outside diameter, a proximate end, and a distal end; a drill bit, said drill bit having a cutting end, said cutting end suitably adapted to drill through materials, a diameter, said diameter of the drill bit being larger than the outside diameter of the primary shaft, and an attachment end, said attachment end located opposite the cutting end of the drill bit and suitably adapted to be secured to the distal end of the primary shaft; a connection mechanism, said connection mechanism suitably adapted to secure the proximate end of the primary shaft to a drill; whereby the drill bit is secured to the distal end of the primary shaft and the primary shaft is secured by the connection mechanism to the drill, with the drill operating to rotate the primary shaft which in turn concurrently rotates the drill bit; and a conduit, said conduit being substantially hollow and substantially cylindrical, having an interior, a length, an outside diameter, a first end, and a second end; wherein the interior of the conduit is suitably adapted to allow a cable to pass into and through said interior of the conduit, and the outside diameter of the conduit is smaller than the inside diameter of the primary shaft, whereby the conduit is suitably adapted to be completely inserted into the interior of the primary shaft.

2. The drilling tool of claim 1 further comprising
a first retaining cap, said first retaining cap having
a surface area,
a surface area width,
a center, and
a central aperture, said central aperture being substantially circular and having an interior diameter;
wherein the width of the surface area of the first retaining cap is larger than the diameter of the drill bit,
the central aperture of the first retaining cap is located substantially in the center of the first retaining cap, and
the interior diameter of the central aperture of the first retaining cap is suitably dimensioned such that the first end of the conduit may be placed through the central aperture of the first retaining cap, whereby when the first end of the conduit is placed through the central aperture of the first retaining cap the first retaining cap is frictionally secured to the first end of the conduit.

3. The drilling tool of claim 2 further comprising
a second retaining cap, said second retaining cap having
a surface area,
a surface area width,
a center, and
a central aperture, said central aperture of the second retaining cap being substantially circular and having an interior diameter;
wherein the width of the surface area of the second retaining cap is larger than the diameter of the drill bit,
the central aperture of the second retaining cap is located substantially in the center of the second retaining cap, and
the interior diameter of the central aperture of the second retaining cap is suitably dimensioned such that the second end of the conduit may be placed through the central aperture of the second retaining cap, whereby when the second end of the conduit is placed through the central aperture of the second retaining cap the second retaining cap is frictionally secured to the second end of the conduit.

4. The drilling tool of claim 3 wherein
the conduit is comprised of a flexible plastic material;
the interior diameter of the central aperture of the first retaining cap is slightly smaller than the outside diameter of the conduit such that when the first retaining cap is placed over the first end of the conduit the first end of the conduit deforms slightly, resulting in the first retaining cap being frictionally securing to the first end of the conduit; and
the interior of the central aperture of the second retaining cap is slightly smaller than the outside diameter of the conduit such that when the second retaining cap is placed over the second end of the conduit the second end of the conduit deforms slightly, resulting in the second retaining cap being frictionally securing to the second end of the conduit.

5. The drilling tool of claim 2 wherein
the conduit is comprised of a flexible plastic material; and
the interior diameter of the central aperture of the first retaining cap is slightly smaller than the outside diameter of the conduit such that when the first retaining cap is placed over the first end of the conduit the first end of the conduit deforms slightly, thereby frictionally securing the first retaining cap to the first end of the conduit.

6. The drilling tool of claim 1 wherein the conduit is comprised of a flexible plastic material.

7. The drilling tool of claim 1 wherein the attachment end of the drill bit is welded to the distal end of the primary shaft.

8. The drilling tool of claim 1 wherein the attachment end of the drill bit is threaded; the distal end of the primary shaft is threaded; and the threads of the attachment end of the drill bit and the threads of the distal end of the primary shaft are suitably adapted to mate with each other such that the attachment end of the drill bit is secured to the distal end of the primary shaft.

9. The drilling tool of claim 1 wherein the attachment end of the drill bit is suitably adapted to be inserted into the interior of the primary shaft at the distal end of the primary shaft; the attachment end of the drill bit has a threaded aperture, said aperture being aligned substantially perpendicular to a longitudinal axis of the drill bit; and the distal end of the primary shaft has a threaded aperture, said aperture of the distal end of the primary shaft being aligned substantially perpendicular to a longitudinal axis of the primary shaft and passing completely through the primary shaft; with both threaded apertures being substantially aligned such that a set screw may be used to secure the attachment end of the drill bit to the distal end of the primary shaft, said set screw suitably adapted to be removable such that the drill bit may be removed and replaced.

10. The drilling tool of claim 1 wherein the connection mechanism comprises an adapter, said adapter having a first end and a second end, said first end of the adapter being suitably adapted to be secured to a drill and said second end of the adapter being suitably adapted to be secured to the proximate end of the primary shaft.

11. The drilling tool of claim 10 wherein
the adapter further comprises a spring-ball-detent mechanism at its second end; and
the primary shaft further comprises one or more indentations in its interior at its proximate end, said indentations suitably adapted to accommodate the spring-ball-detent mechanism of the adapter.

12. The drilling tool of claim 1 wherein the connection mechanism comprises an extension shaft, said extension shaft being hollow and substantially cylindrical, and having an interior, an outside diameter, an inside diameter, a proximate end, a distal end, and a length; wherein the outside diameter of the extension shaft is substantially the same as the outside diameter of the primary shaft, the inside diameter of the extension shaft is substantially the same as the inside diameter of the primary shaft, the length of the extension shaft is longer than the length of the primary shaft, the distal end of the extension shaft is suitably adapted to be secured to the proximate end of the primary shaft, and the proximate end of the extension shaft is suitably adapted to be secured to the drill.

13. The drilling tool of claim 12 wherein
the distal end of the extension shaft is threaded;
the proximate end of the primary shaft is threaded; and
the threads of the distal end of the extension shaft and the threads of the proximate end of the primary shaft are suitably adapted to mate with each other such that the distal end of the extension shaft is secured to the proximate end of the primary shaft.

14. The drilling tool of claim 12 wherein the connection mechanism further comprises an adapter, said adapter having a first end and a second end, said first end of the adapter being suitably adapted to be secured to a drill and said second end of the adapter being suitably adapted to be secured to the proximate end of the extension shaft.

15. The drilling tool of claim 14 wherein
the adapter further comprises a spring-ball-detent mechanism at its second end; and
the extension shaft further comprises one or more indentations in its interior at its proximate end, said indentations suitably adapted to accommodate the spring-ball-detent mechanism of the adapter.

16. A drilling tool comprising
a primary shaft, said primary shaft being substantially cylindrical and having
a length,
an outside diameter,
a proximate end, and
a distal end;
a drill bit, said drill bit having
a cutting end, said cutting end suitably adapted to drill through materials,
a diameter, said diameter of the drill bit being larger than the outside diameter of the primary shaft, and
an attachment end, said attachment end located opposite the cutting end of the drill bit and suitably adapted to be secured to the distal end of the primary shaft;
a connection mechanism, said connection mechanism suitably adapted to secure the proximate end of the primary shaft to a drill;
a conduit, said conduit being substantially hollow and substantially cylindrical, having
an interior,
a length,
an outside diameter,
a first end, and
a second end; and
a first retaining cap, said first retaining cap having
a surface area,
a surface area width,
a center,
a centering spindle, said centering spindle being substantially cylindrical and having an outer diameter, and
a central aperture, said central aperture being substantially circular and having an interior diameter;
wherein the drill bit is secured to the distal end of the primary shaft,
the primary shaft is secured by the connection mechanism to the drill, with the drill operating to rotate the primary shaft which in turn concurrently rotates the drill bit,
the interior of the conduit is suitably adapted to allow the primary shaft to pass into and through said interior of the conduit,
the length of the conduit is shorter than the length of the primary shaft,
the outside diameter of the conduit is just slightly smaller than the diameter of the drill bit,
the width of the surface area of the first retaining cap is larger than the diameter of the drill bit,
the centering spindle of the first retaining cap is located substantially in the center of the first retaining cap, with a longitudinal axis of said centering spindle of the first retaining cap being substantially perpendicular to the surface area of the first retaining cap,
the central aperture of the first retaining cap is located substantially in the center of the first retaining cap and passes through the centering spindle of the first retaining cap substantially along the longitudinal axis of the centering spindle of the first retaining cap,
the outer diameter of the centering spindle of the first retaining cap is suitably dimensioned such that the centering spindle of the first retaining cap may be inserted into the interior of the conduit at the first end of the conduit, whereby when the centering spindle of the first retaining cap is inserted into the interior of the conduit at the first end of the conduit the first retaining cap is frictionally secured to the conduit, and
the interior diameter of the central aperture of the first retaining cap is suitably dimensioned such that the primary shaft may be placed through the central aperture of the first retaining cap, whereby when the primary shaft is placed through the central aperture of the first retaining cap the first retaining cap is frictionally secured to the primary shaft.

17. The drilling tool of claim 16 further comprising
a second retaining cap, said second retaining cap having
a surface area,
a surface area width,
a center, a centering spindle, said centering spindle being substantially cylindrical and having an outer diameter, and a central aperture, said central aperture being substantially circular and having an interior diameter;

wherein the width of the surface area of the second retaining cap is larger than the diameter of the drill bit, the centering spindle of the second retaining cap is located substantially in the center of the second retaining cap, with a longitudinal axis of said centering spindle of the second retaining cap being substantially perpendicular to the surface area of the second retaining cap, the central aperture of the second retaining cap is located substantially in the center of the second retaining cap and passes through the centering spindle of the second retaining cap substantially along the longitudinal axis of the centering spindle of the second retaining cap, the outer diameter of the centering spindle of the second retaining cap is suitably dimensioned such that the centering spindle of the second retaining cap may be inserted into the interior of the conduit at the second end of the conduit, whereby when the centering spindle of the second retaining cap is inserted into the interior of the conduit at the second end of the conduit the second retaining cap is frictionally secured to the conduit, and the interior diameter of the central aperture of the second retaining cap is suitably dimensioned such that the primary shaft may be placed through the central aperture of the second retaining cap, whereby when the primary shaft is placed through the central aperture of the second retaining cap the second retaining cap is frictionally secured to the primary shaft.

18. The drilling tool of claim 16 wherein the conduit is comprised of a flexible plastic material.

19. The drilling tool of claim 16 wherein the attachment end of the drill bit is threaded;

the distal end of the primary shaft is threaded; and the threads of the attachment end of the drill bit and the threads of the distal end of the primary shaft are suitably adapted to mate with each other such that the attachment end of the drill bit is secured to the distal end of the primary shaft.

20. The drilling tool of claim 16 wherein the attachment end of the drill bit is hollow;

the distal end of the primary shaft is suitably adapted to be inserted into the hollow attachment end of the drill bit;

the attachment end of the drill bit has a threaded aperture, said aperture being aligned substantially perpendicular to a longitudinal axis of the drill bit and passing completely through the attachment end of the drill bit; and the distal end of the primary shaft has a threaded aperture, said aperture of the distal end of the primary shaft being aligned substantially perpendicular to a longitudinal axis of the primary shaft;

with both threaded apertures being substantially aligned such that a set screw may be used to secure the attachment end of the drill bit to the distal end of the primary shaft, said set screw suitably adapted to be removable such that the drill bit may be removed and replaced.

21. The drilling tool of claim 16 wherein the connection mechanism comprises an extension shaft, said extension shaft being solid and substantially cylindrical, and having an outside diameter, a proximate end, a distal end, and a length;

wherein the outside diameter of the extension shaft is substantially the same as the outside diameter of the primary shaft, the length of the extension shaft is longer than the length of the primary shaft, the distal end of the extension shaft is suitably adapted to be secured to the proximate end of the primary shaft, and the proximate end of the extension shaft is suitably adapted to be secured to the drill.

22. The drilling tool of claim 21 wherein the distal end of the extension shaft is an open ended cylinder, said cylinder having an inside diameter substantially the same as the outside diameter of the primary shaft and an outside diameter smaller than the inside diameter of the conduit, such that the proximate end of the primary shaft is suitably adapted to be inserted into the open ended cylinder of the extension shaft, with the distal end of the extension shaft further comprising one or more threaded apertures, each said aperture being aligned substantially perpendicular to a longitudinal axis of the distal end of the extension shaft, and the proximate end of the primary shaft has one or more threaded apertures, each said aperture of the proximate end of the primary shaft being aligned substantially perpendicular to a longitudinal axis of the primary shaft, whereby the threaded apertures of the distal end of the extension shaft are substantially aligned with the threaded apertures of the proximate end of the primary shaft when the proximate end of the primary shaft is inserted into the open ended cylinder of the extension shaft such that set screws may be used within the aligned threaded apertures to secure the distal end of the extension shaft to the proximate end of the primary shaft, said set screws suitably adapted to be removable such that the extension shaft bit may be detached from the primary shaft.

23. The drilling tool of claim 21 further comprising a bushing, said bushing being substantially circular and having a central aperture, the outside diameter of said bushing being substantially the same as the inside diameter of the conduit and the diameter of the central aperture of the bushing being substantially the same as the out side diameter of the primary shaft, such that the bushing may be placed over the primary shaft near the proximate end of the primary shaft, being frictionally secured thereto, thereby centering the primary shaft within the conduit.

* * * * *